United States Patent
Chen

(10) Patent No.: US 6,364,818 B1
(45) Date of Patent: Apr. 2, 2002

(54) CNC MACHINE CENTER WITH DOUBLE-SPEED SHIFTING FEATURE IN X AND Z AXES

(76) Inventor: Hsi-Kuan Chen, 13 Fl.-2, No. 92, Chung-Kung Rd., Taichung (TW)

( * ) Notice: Subject to any disclaimer, the term of this patent is extended or adjusted under 35 U.S.C. 154(b) by 0 days.

(21) Appl. No.: 09/765,125

(22) Filed: Jan. 18, 2001

(51) Int. Cl.[7] ............................................. B23Q 3/157
(52) U.S. Cl. .................... 483/30; 29/27 R; 408/137; 408/234; 409/145; 409/185; 409/189; 409/235; 483/40
(58) Field of Search ................................ 409/235, 183, 409/145, 286, 285, 185, 189; 408/137, 129, 234; 451/160; 483/30, 38, 40, 43; 83/623; 74/424.71, 89.23

(56) References Cited

U.S. PATENT DOCUMENTS

| | | | | |
|---|---|---|---|---|
| 2,254,032 A | * | 8/1941 | Fischer | 408/137 |
| 2,851,826 A | * | 9/1958 | Cituet | 408/137 |
| 4,163,622 A | * | 8/1979 | Akaba | 408/145 X |
| 4,306,382 A | * | 12/1981 | Veda | 451/160 |
| 5,373,765 A | * | 12/1994 | Asano et al. | 83/623 |
| 5,662,441 A | * | 9/1997 | Wang | 409/185 |
| 5,782,588 A | * | 7/1998 | Gardner | 408/137 |
| 5,984,600 A | * | 11/1999 | Gierth | 409/269 |

FOREIGN PATENT DOCUMENTS

| | | | | |
|---|---|---|---|---|
| JP | 6-8109 | * | 1/1994 | 409/235 |
| JP | 6-190675 | * | 7/1994 | 408/137 |

* cited by examiner

Primary Examiner—William Briggs
(74) Attorney, Agent, or Firm—Senniger, Powers, Leavitt & Roedel

(57) ABSTRACT

A CNC machine center with double-speed shifting feature in X and Z axes, comprises an upright stand for disposing a worktable assembly and a tool holder assembly. The worktable assembly and the tool assembly are relatively movable with each other in two perpendicular coordinate axes, i.e., X-axis and Z-axis. It is characterized in that in at least one of X-axis and Z-axis, the tool holder assembly and the worktable assembly are interconnected with each other by a screw rod having a positive thread section and a counter thread section, thereby the tool holder assembly and worktable assembly can be simultaneously shifted in opposite directions to obtain a relative shifting speed double of conventional one, so that the non-cutting operation time of a machine center is greatly reduced, and so that the overall machining speed and efficiency are improved.

3 Claims, 5 Drawing Sheets

CNC MACHINE CENTER WITH DOUBLE-SPEED SHIFTING FEATURE IN X AND Z AXES

BACKGROUND OF THE INVENTION

1. Field of the Invention

The present invention relates to a computer numerical control (CNC) machine center, and particularly to a CNC machine center using a screw rod having positive thread and counter thread respectively in association with two nuts respectively secured on a tool holder assembly and a worktable assembly to simultaneously shift the tool holder assembly and the worktable assembly in opposite directions along at least one coordinate axis, so as to significantly increase the relative shifting speed between the tool holder assembly and the worktable assembly, to minimize non-cutting time of a CNC machine center.

2. Description of Related Art

Generally, in order to accomplish a purpose for cutting a workpiece by a tool, a computer numerical control (CNC) tool machine is equipped with facility for feeding the tool toward the workpiece during a cutting operation period and with facility for changing and adjusting the relative positions between the tool and the workpiece during a non-cutting operation period. In the cutting operation, the speed for feeding the tool toward the workpiece is determined by the characteristics of the material to be machined, and thus shall not be changed or increased arbitrarily. However, if the speed for shifting or adjusting the relative positions between the tool and the workpiece during the non-cutting operation period is increased, the overall machining speed and efficiency of the machine center will be greatly improved.

FIG. 1 illustrates a conventional CNC machine center (M/C) having a worktable T engaging a translation seat T1 by virtue of a nut (not shown) in association with a screw rod R, so that the worktable T is reciprocatable along X-axis on the translation seat T1, when a servo motor M rotates the screw rod R. The translation seat T1 engages the frame foundation F by an additional screw rod/nut mechanism, so that the translation seat T1 is reciprocatable along Y-axis on the frame foundation F. Similarly, a tool holder B is disposed on an upright stand FV by a nut N and a screw rod R, so that the tool holder B is reciprocatable along Z-axis on the upright stand FV. Therefore, the relative positions in three coordinate axes between the tool holder B and the worktable T are all adjustable to facilitate the machining operation.

Referring to the conventional manner of applying a screw rod/nut mechanism, e.g., the transmission mechanism including the screw pair of the screw rod R and the nut N illustrated in FIG. 1, to change the relative positions between a tool holder and a worktable, if one intends to increase the speed for the tool holder to get closer to or to depart away from the worktable, he can only accomplish this purpose by increasing the rotation of the screw rod by using a higher speed servo motor. It is, however, found that none of the existing servomotors available in marketplace would satisfy this need for providing a satisfactory shifting speed between the tool holder and worktable during the non-cutting operation period.

Especially, when the conventional screw rod/nut mechanism is applied to reciprocate the tool holder along a vertical axis, e.g. the tool holder B reciprocated along vertical Z-axis by the screw rod R in association with the nut N of the conventional CNC machine center illustrated in FIG. 1, the load of the servo motor M to rotate the screw rod R for upwardly shifting the tool holder B is significantly greater than the load of the servo motor for downwardly shifting the tool holder B, due to the weight of the tool holder B. This not only reduces the service life of the servomotor, but also is disadvantageous to the control of the operational speed. To overcome such problem as to the servo motor bearing different loads when driving a screw rod to upwardly and downwardly shift the tool holder B, the conventional art applies a chain, wire or the like to draw a balance weight, to balance the weight of the tool holder B, and to avoid the problem that the servo motor has different loads when upward and downward shifting the tool holder B. Though this is feasible and practicable, it makes a tool machine complicated in construction, bulky and cumbersome, and disadvantageous for manufacture and maintenance.

Referring to the conventional CNC machine center illustrated in FIG. 1, the tool holder B is shifted upward or downward when the servo motor M clockwise or counterclockwise rotating the screw rod R. Such an operation manner and construction of applying a servo motor M in association with a screw rod/nut mechanism to upward and downward shift a tool holder B, when electric power is unexpectedly off or the servo motor is not energized, the weight of the tool holder B creates a torque to rotate the freely rotatable screw rod R, and is gradually moved downward by the weight of the tool holder B. This would subsequently result in that the tool holder collides with and damages the workpiece, worktable, or the other parts of the machine.

SUMMARY OF THE INVENTION

An object of the present invention is to provide a CNC machine center, in which the relative shifting speed along at least one coordinate axis between the tool and the workpiece is the double of the relative shifting speed of the conventional one applying a screw rod/nut mechanism to simply shift either the tool or the workpiece. The present invention applies a screw rod having two sections of opposite threads, namely positive thread and counter thread, in association with two nuts separately secured on a tool holder assembly and a worktable assembly to accomplish the relative movement or shifting of the tool and the workpiece, so that the non-cutting operation time of a CNC machine center is significantly reduced, and the overall machining speed and efficiency are improved.

A further object of the present invention is to provide a CNC machine center, in which a tool holder assembly and a worktable assembly are reciprocatably disposed along a vertical axis by virtue of a screw rod having two sections of opposite threads, namely positive thread and counter thread, respectively, in association with two nuts respectively secured on the tool holder assembly and the worktable assembly, so that a servo motor, when rotating the screw rod clockwise or counterclockwise to shift the relative position along the vertical axis between the tool holder assembly and the worktable assembly, is of a substantially identical load, without using any additional balance weight.

A still further object of the present invention is to provide a CNC machine center that can avoid the tool holder to collide with the workpiece or the machine, when the electric power is unexpectedly off or the servomotor is not energized.

Additional objects, operational principle, construction, advantages, construction, and features of the present invention will become apparent from the following description and the appended claims, taken in conjunction with the accompanying drawings, in which like reference numerals identify like elements.

PREFERRED EMBODIMENT OF THE PRESENT INVENTION

Figure 1:
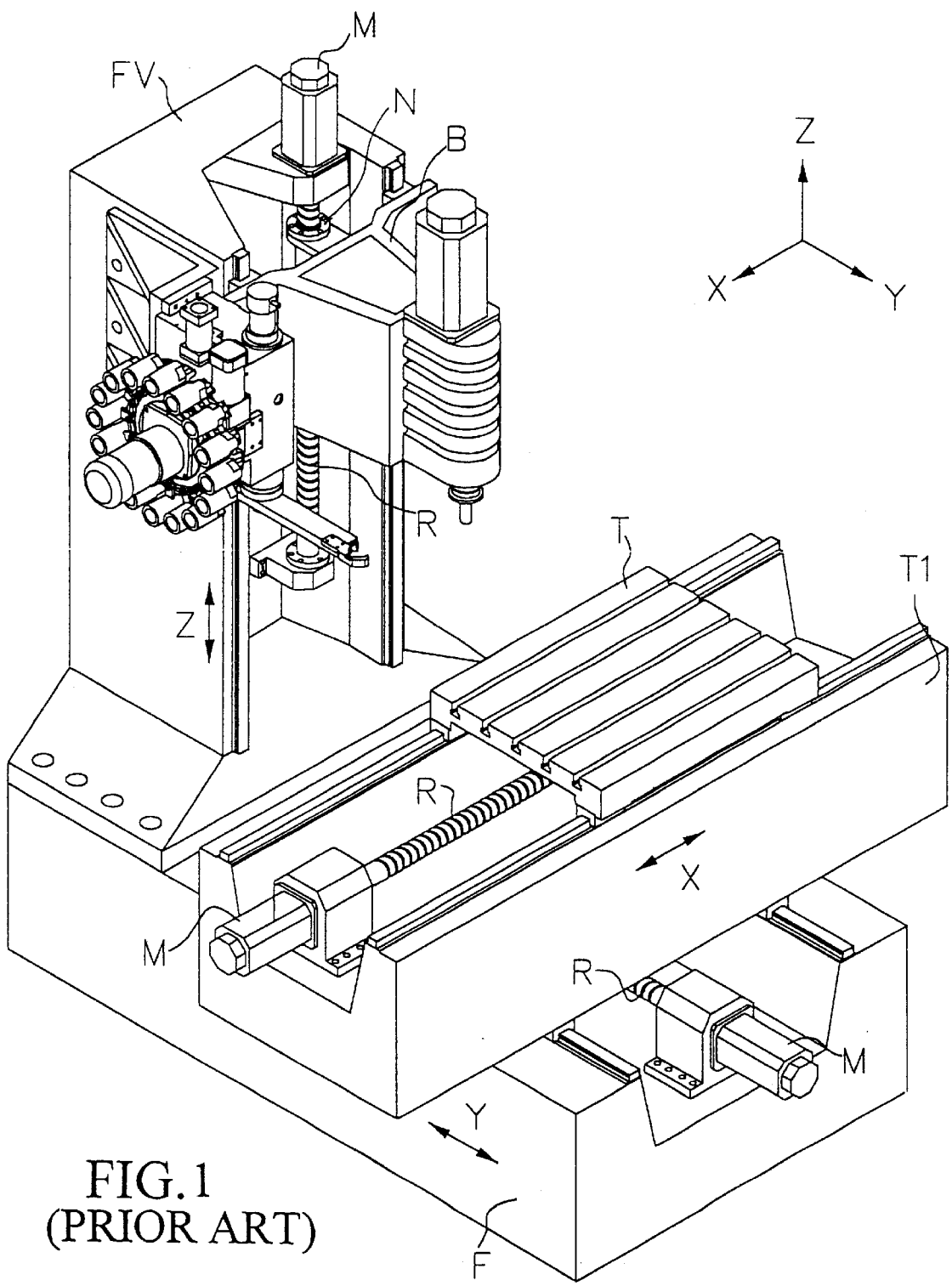
FIG. 1 is a schematically perspective view of a conventional CNC machine center, showing that the worktable and tool holder can relatively and respectively move along X, Y, and Z axes.

Certain terminology may be employed in the following description for convenience rather than for any limiting purpose. For example, the terms "forward," "rearward," "right," "left," "upper," and "lower" designate directions in the drawings to which reference is made, with the terms "inward," "inner," or "inboard" and "outward," "outer," or "outboard referring, respectively, to directions toward and away from the center for the referenced element, the terms "radial" and "axial" referring, respectively, to directions or planes perpendicular and parallel to the longitudinal central axis of the referenced element. Terminology of similar import other than the words specifically mentioned above likewise is to be considered being used for purposes of convenience rather than in any limiting sense. To facilitate illustration and description, X, Y and Z axes to be mentioned hereinafter are referred to three coordinate axes perpendicular to one another and indicated in the accompanying drawings. The vertical direction is referred to a direction substantially perpendicular to the ground. Like reference numerals identify like elements in the accompanying drawings.

Figure 2:
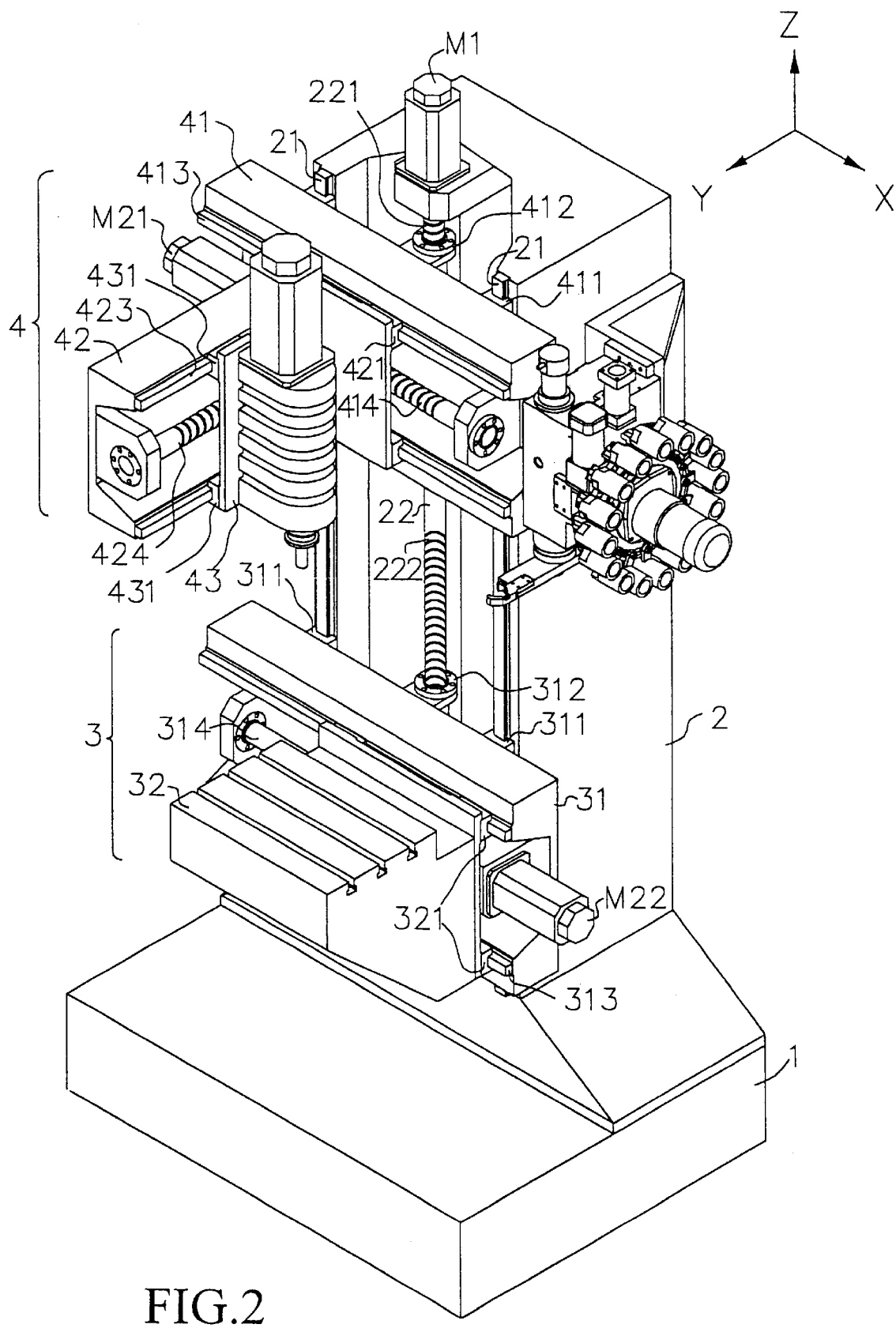
FIG. 2 is a schematically perspective view of the first preferable embodiment of the CNC machine center in accordance with the present invention, showing that the relative movement between the worktable and the tool holder along a vertical axis, i.e., Z-axis, is accomplished by virtue of a screw rod having a positive thread section and a counter thread section for respectively in association with a nut secured on the worktable and another nut secured on the tool holder, so that the worktable and the tool holder can relatively move at a double speed along the vertical Z-axis.
Figure 3:
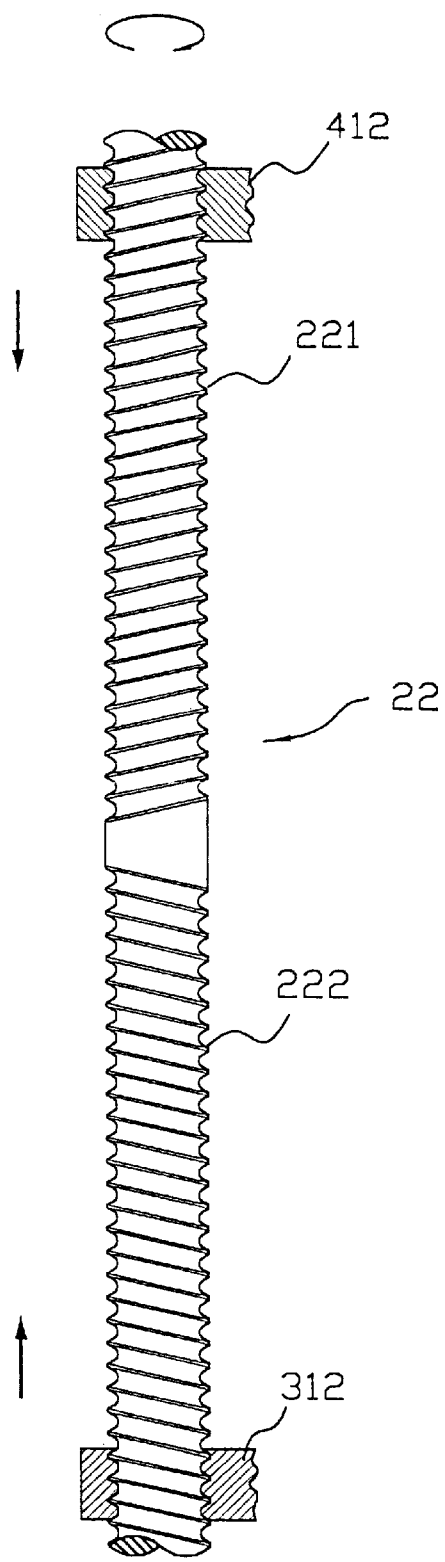
FIG. 3 is a schematically operative view of the screw rod in accordance with the present invention having positive thread section and counter thread section in association with two nuts respectively secured on the worktable and the tool holder, showing that the screw rod is rotating clockwise, so that the worktable and the tool holder are getting closer to each other.

As illustrated in FIG. 2, a CNC machine center in accordance with the first preferable embodiment of the present invention comprises a frame foundation 1, an upright stand 2, a worktable assembly 3, a tool holder assembly 4. The upright stand 2 upwardly and vertically extends from the frame foundation 1, including two upright rails 21 parallel to each other. Referring to FIGS. 2 and 3, a screw rod 22 having two sections of opposite threads, namely positive thread 221 and counter thread 222, is rotatably disposed on the upright stand 2 along a vertical Z-axis, and is rotatable clockwise and counterclockwise by a servo motor M1.

The worktable assembly 3 is provided for supporting and fixing a workpiece to be machined, comprising a Z-axis lower seat 31 and a worktable 32; wherein the Z-axis lower seat 31 is formed with two sliders 311 to associate with the rails 21 for guiding the Z-axis lower seat 31 to reciprocate upward and downward along Z-axis on the upright stand 2. A nut 312 is secured on the Z-axis lower seat 31 to associate with the counter thread section 222 of the screw rod 22 for reciprocating the Z-axis lower seat 31 along Z-axis, when the screw rod 22 is rotated by the servo motor M1. The Z-axis lower seat 31 is provided along X-axis with two parallel rails 313 and a screw rod 314 pivotally mounted on the X-axis lower seat 31 and rotated by a servomotor M22.

The worktable 32 comprises two sliders 321 to associate with the rails 313 and a nut (not shown) to associate with the screw rod 314, so that the worktable 32 is reciprocatable on the rails 313 along X-axis when the servo motor M22 rotates the screw rod 314.

The tool holder assembly 4 comprises a Z-axis upper seat 41, an X-axis upper seat 42 and a Y-axis translation seat 43. The Z-axis upper seat 41, similar to the Z-axis lower seat 31 as described above, is formed with two sliders 411 to associate with the rails 21 and a nut 412 to associate with the positive thread section 221 of the screw rod 22, so that the Z-axis upper seat is shifted upward or downward along Z-axis when the screw rod 22 is rotated by the servo motor M1. The Z-axis upper seat 41 is provided along X-axis two parallel rails 413 and a screw rod 414 that is pivotally mounted on the X-axis upper seat 41 along X-axis, and is rotated by a servomotor M21.

The X-axis upper seat 42 is provided with two parallel slides 421 to associate with the rails 413 and a nut (not shown) to associate with the screw rod 414, so that the X-axis upper seat 42 is reciprocatable on the rails 413 along X-axis when the screw rod 414 is rotated by the servo motor M21. The X-axis upper seat 42 is further provided along Y-axis with two parallel rails 423 and a screw rod 424 which is pivotally mounted on the X-axis upper seat 42 along Y-axis and driven by a servomotor (not shown).

The Y-axis translation seat 43 is provided for carrying a tool spindle (without reference numeral), comprising two sliders 431 to associate with the rails 423 and a nut (not shown) to associated with the screw rod 424, so that the Y-axis translation seat 43 is reciprocatable on rails 423 along Y-axis when the screw rod 424 is rotated by a servo motor (not shown).

Figure 4:
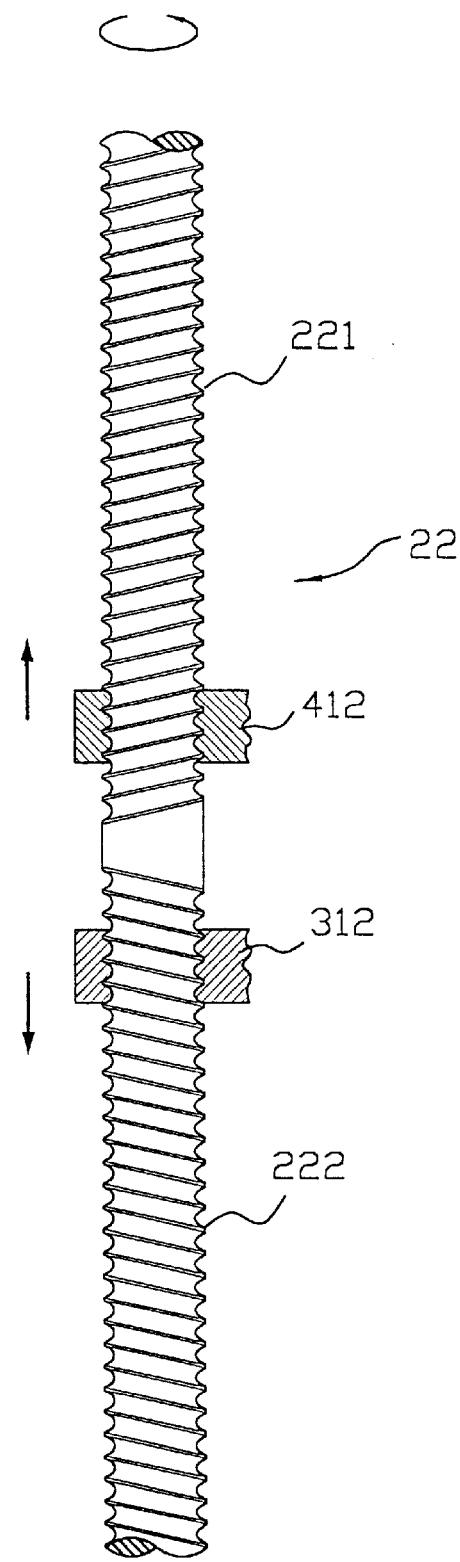
FIG. 4 is another schematically operative view of the screw rod in accordance with the present invention, showing that the screw rod is rotating counterclockwise, so that the worktable and the tool holder are departing away from each other.

As preferably illustrated in FIGS. 2, 3, and 4, in the vertical direction of Z-axis, since the screw rod 22 comprises the positive thread section 221 and the counter thread section 222 to respectively associate with the nuts 412 and 312 respectively secured on the tool holder assembly 4 and the worktable assembly 3, the worktable assembly 3 and the tool holder assembly 4 will simultaneously move in two opposite directions along Z-axis to get closer to (see FIG. 3) or to depart away from (see FIG. 4) each other, when the screw rod 22 is rotated clockwise (see FIG. 3) or counter-clockwise (see FIG. 4) by the servomotor M1, so that the relative shifting speed along Z-axis between the worktable assembly 3 and the tool holder assembly 4 is the double of the shifting speed of the conventional one illustrated in FIG. 1 using the screw rod R having a single thread in association with a nut N to shift the tool holder relative to the workpiece. No matter how the servo motor increases the rotation of the screw rod, the relative shifting speed between the tool holder assembly and the workpiece table assembly in at least one axis as suggested by the present invention is the double of the conventional one accomplished by using a screw rod having a single thread in association with a nut attached on a tool holder or a worktable.

In X-axis direction, when servomotors M21 and M22 respectively rotate the single threaded screw rods 414 and 14 simultaneously, the X-axis upper sea t 41 and the worktable 32 simultaneously move in opposite directions along X-axis, so that the relative shifting speed between the tool holder and the worktable along X-axis is also increased to the double , as compared with the conventional one that simply shifts either the tool holder or the worktable.

In Y-axis direction, since the distance required for the tool to move in this direction is very short, the shifting operation of the tool holder in Y-axis direction can be accomplished simply by a conventional manner of using the single threaded screw rod 424 rotated by a servomotor (not shown) in association with a nut (not shown) secured on the Y-axis translation seat 43.

Since the screw rod 22 vertically and rotatably disposed along Z-axis comprises the positive thread section 221 and the counter thread section 222 for respectively in association with the nuts 412 and 312 respectively secured on the tool holder assembly 4 and the worktable assembly 3, if the weight of the work table assembly 3 is designed to substantially equivalent to the total weight of the tool holder assembly 4, a torque created by the weight of the worktable assembly 3 to rotate the screw rod 22 in one direction will be countervailed or neutralized by a counter torque created by the weight of the tool holder assembly 4 to rotate the screw rod 22 in the other direction. Therefore, the loads for the servomotor M1 for rotating the screw rod 22 clockwise and counterclockwise are substantially identical with each other, and thus it is unnecessary to provide and any additional balance weight to diminish the load difference for the servomotor to rotate the vertical screw rod clockwise and counterclockwise.

During the operation of the machine center, when a workpiece is placed on the workpiece table 32, if the machine center is unexpectedly power-off, since the total weight of the worktable assembly 3 and the workpiece is slightly greater than the total weight of the tool holder assembly 4, the worktable assembly 3 will move downward slowly, and create a torque to rotate the screw rod 22 and to upwardly and slowly shift the tool holder assembly 4. As a result, the tool fixed on the tool holder assembly 4 will never collide the workpiece placed on the worktable assembly 3, when the machine center is switched off or unexpectedly power-off.

Figure 5:
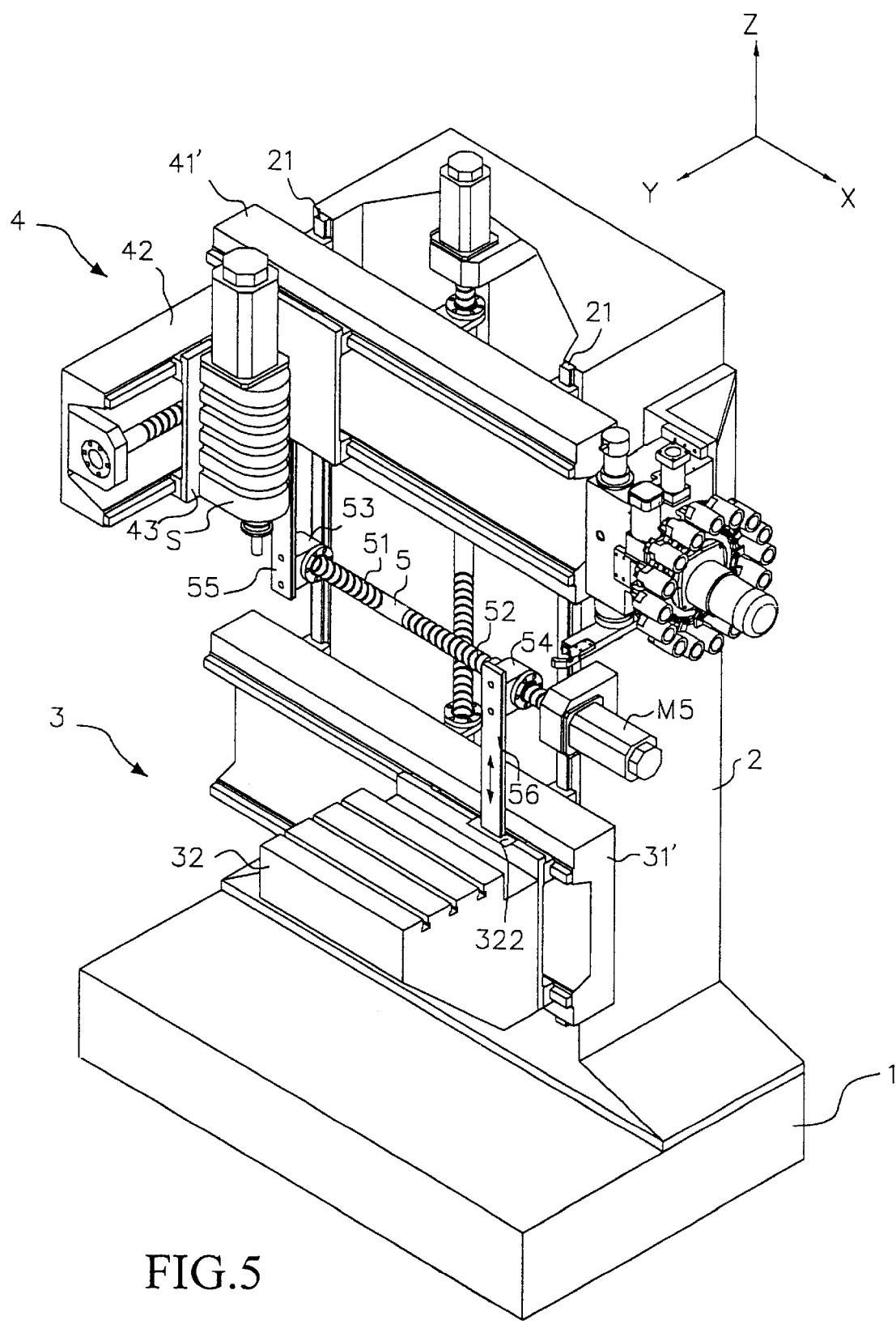
FIG. 5 is a schematically perspective view of a CNC machine center in accordance with the second preferable embodiment of the present invention.

FIG. 5 illustrates a second preferable embodiment of a CNC machine center of the present invention. The construction of the second embodiment is similar with the construction of the first embodiment illustrated in FIG. 2 and described above. Especially, the constructions provided in the second embodiment for performing the relative shifting operations between the tool holder assembly 4 and the worktable assembly 3 respectively along Z-axis and Y-axis are substantially identical with the corresponding ones provided in the first embodiment illustrated in FIG. 2. The first embodiment illustrated in FIG. 2 performs the relative shifting operation of the worktable assembly 3 and the tool holder assembly 4 along X-axis by virtue of two servomotors M21 and M22 separately and simultaneously rotating two single threaded screw rods 414 and 314. Contrastively, the second embodiment performs the relative shifting operation between the worktable assembly 3 and the tool holder assembly 4 along X-axis by virtue of a screw rod having opposite threads and driven by a servo motor, similar with the screw rod 22 illustrated in FIGS. 2 and 3, to associate with two nuts respectively secured on the worktable 32 and the X-axis upper seat 42. Particularly, the second embodiment of the CNC machine center illustrated in FIG. 5 comprises a screw rod 5 having two sections of opposite threads similar to the screw rod 22 illustrated in FIGS. 2 and 3. The screw rod 5 comprising a positive thread section 51 and a counter thread section 51 is pivotally mounted on the upright stand 2 along X-axis, and driven by a servo motor M5 to rotate clockwise and counterclockwise. In association with the positive thread section 51 and the counter thread section 52 of the screw rod 5, the tool holder assembly 4 and the workable assembly 3 respectively comprise a nut 53 and a nut 54 respectively secured on rails 55 and 56 extending along Z-axis. The worktable 32 is formed along Z-axis with a slider 322 allowing the rail 56 to insert therein and to slide on the rail 56 along Z-axis. Similar to the slider 322 of the worktable 32, the X-axis upper seat 42 is formed along Z-axis a sliding groove (not shown) allowing the rail 55 to insert and slide therein along Z-axis. Therefore, two nuts 53 and 54 are simultaneously moved in two opposite directions on the screw rod 5 along X-axis when the servomotor M5 rotates the screw rod 5, so as to get closer with or to depart away from each other. By transmission through the rails 55 and 56, the X-axis upper seat 42 and the worktable 32 are simultaneously moved in opposite directions along X-axis to get closer to or to depart away from each other.

Figure 6:
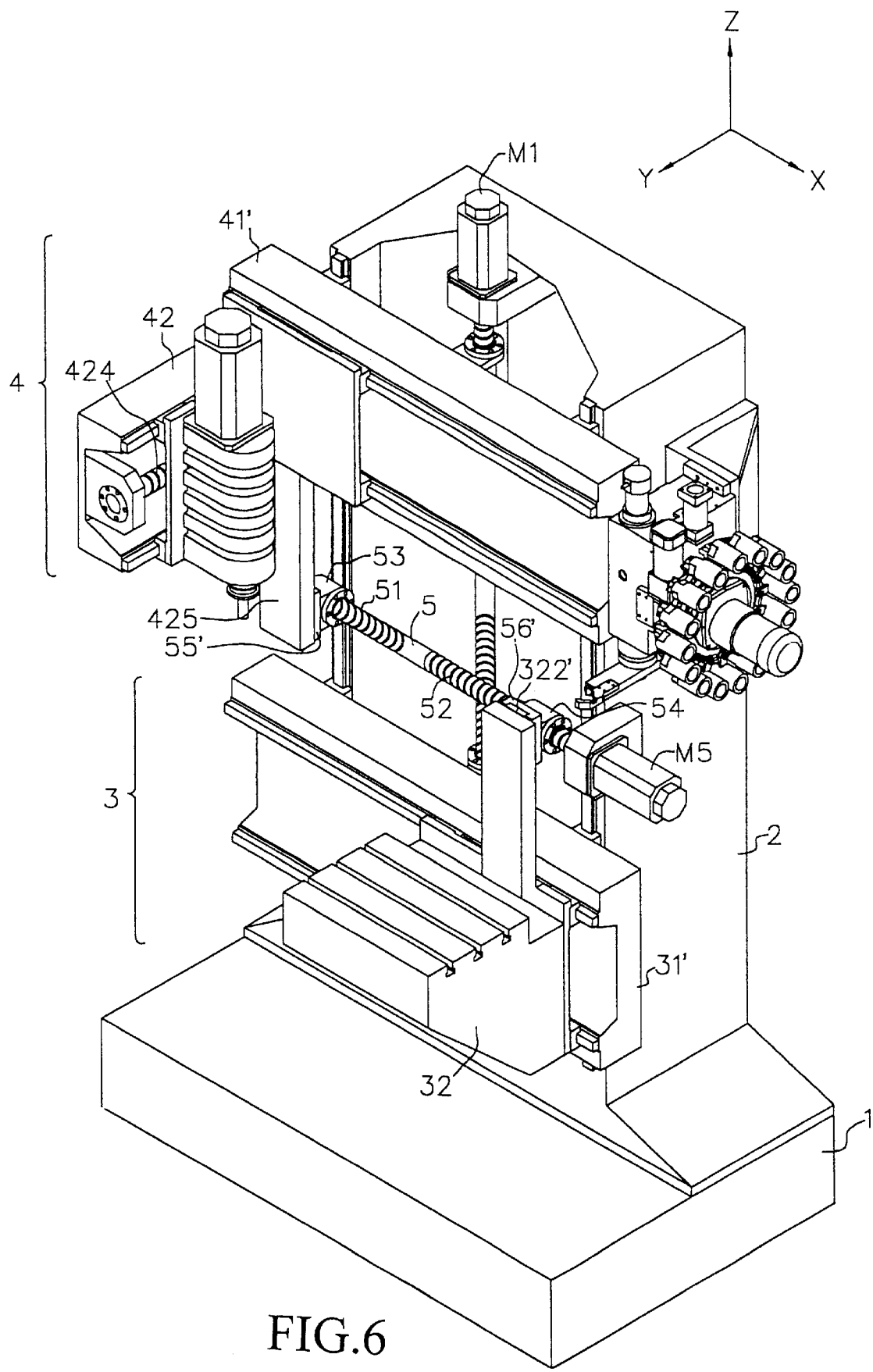
FIG. 6 is a schematically perspective view of a CNC machine center in accordance with the third preferable embodiment of the present invention.

FIG. 6 illustrates a third embodiment of the CNC machine center of the present invention. The constructions of the third embodiment are substantially identical with the ones of the second embodiment illustrated in FIG. 5, excepting that the nuts 53 and 54 of the third embodiment are respectively formed with a slider 55' and a slider 56' to slidably associate with a rail 425 extending along Z-axis from the X-axis upper seat 42 and a rail 322' extending along Z-axis from the worktable 32. By virtue of the power transmission through the sliders 53 and 54 slidably engaging the rails 425 and 322', the X-axis upper seat 42 and the worktable 32 are simultaneously moved in opposite directions along X-axis, when the servomotor M5 rotates the screw rod 5 to drive the nuts 53 and 54 simultaneously moving in opposite directions along X-axis.

The above-described embodiment of the present invention is intended to illustrate only. Numerous alternative embodiments may be devised by persons skilled in the art without departing from the scope of the following claims.

What is claimed is:

1. A CNC machine center with double-speed shifting feature in X and Z axes, comprising:

a frame foundation;

an upright stand vertically and upwardly extending from the frame foundation along a first coordinate axis (Z-axis);

a first screw rod including two sections of opposite threads, namely a positive thread section and a counter thread section, and pivotally disposed on the upright stand along the first coordinate axis;

a worktable assembly reciprocatably disposed on the upright stand along the first coordinate axis, including a first nut engaging the counter thread section of the first screw rod for reciprocating the worktable assembly along the first coordinate axis in a shifting direction when the first screw rod is rotated in one direction, a Z-axis lower seat and a worktable, in which the Z-axis lower seat engages the counter thread section of the first screw rod by the first nut, and the worktable engaging the Z-axis lower seat and movable relative to the Z-axis lower seat along a second coordinate axis (X-axis) perpendicular to the first coordinate axis; wherein the Z-axis lower seat comprises a second screw rod pivotally disposed along the second coordinate axis; and wherein the worktable comprises a third nut engaging the second screw rod for reciprocating the worktable along the second screw rod and along the second coordinate axis;

a tool holder assembly reciprocatable disposed on the upright stand along the first coordinate axis, including a second nut engaging the positive thread section of the first screw rod for reciprocating the tool holder assembly along the first coordinate axis in a direction opposite to the shifting direction of the worktable assembly when the first screw rod is rotated, a Z-axis upper seat, an X-axis upper seat, and a Y-axis translation seat, in which the Z-axis upper seat engages the positive thread section of the first screw rod by the second nut; the X-axis upper seat engaging the Z-axis upper seat and movable relative to the Z-axis upper seat along the second coordinate axis; the Y-axis translation seat engaging the X-axis upper seat and movable relative to the X-axis upper seat along a third coordinate axis (Y-axis) perpendicular to the first and second coordinate axes; wherein the Z-axis upper seat comprises a third screw rod pivotally disposed along the second coordinate axis; and wherein the X-axis upper seat is provided with a fourth nut engaging the third screw rod for reciprocating the X-axis upper seat along the third screw rod and along the second coordinate axis.

2. The CNC machine center with double-speed shifting feature in X and Z axes of claim 1, wherein the X-axis upper seat comprises a fourth screw rod pivotally disposed along the third coordinate axis; and wherein the Y-axis translation seat is provided with a fifth nut engaging the fourth screw rod for reciprocating the Y-axis translation seat along the fourth screw rod and along the third coordinate axis.

3. A CNC machine center with double-speed shift feature in X and Z axes, comprising:

a frame foundation;

an upright stand vertically and upwardly extending from the frame foundation along a first coordinate axis (Z axes);

a first screw rod including sections of opposite threads, namely a positive thread section and a counter thread section, and pivotally disposed on the upright stand along the first coordinate axis;

a fifth screw rod including two sections of opposite threads, namely a positive thread section and a counter thread section, and pivotally disposed on the upright stand along a second coordinate axis (X-axis) perpendicular to the first coordinate axis (Z-axis);

a worktable assembly reciprocatably disposed on the upright stand along the first coordinate axis, including a first nut engaging the counter thread section of the first screw rod for reciprocating the worktable assembly along the first coordinate axis in a shifting direction when the first screw rod is rotated in one direction, a Z-axis lower seat and a worktable, in which the Z-axis lower seat engages the counter thread section of the first screw rod by the first nut, and the worktable engaging the Z-axis lower seat and movable relative to the Z-axis lower seat along the second coordinate axis; wherein the worktable includes a sixth nut engaging the counter thread section of the fifth screw rod for reciprocating the worktable along the fifth screw rod and along the second coordinate axis in a shifting direction by the rotation of the fifth screw rod;

a tool holder assembly reciprocatably disposed on the upright stand along the first coordinate axis, including a second nut engaging the positive thread section of the first screw rod for reciprocating the tool holder assembly along the first coordinate axis in a direction opposite to the shifting direction of the worktable assembly when the first screw rod is rotated, a Z-axis upper seat, an X-axis upper seat, and a Y-axis translation seat, in which the Z-axis upper seat engages the positive thread section of the first screw rod by the second nut; the X-axis upper seat engaging the Z-axis upper seat and movable relative to the Z-axis upper seat along the second coordinate axis; the Y-axis translation seat engaging the X-axis upper seat and movable relative to the X-axis upper seat along a third coordinate axis (Y-axis) perpendicular to the first and second coordinate axes; wherein the X-axis upper seat comprises a seventh nut engaging the positive thread section of the fifth screw rod for reciprocating the X-axis upper seat along the fifth screw rod and along the second coordinate axis in a shifting direction opposite to the shifting direction of the worktable by the rotation of the fifth screw rod.

* * * * *